United States Patent
Richard et al.

(10) Patent No.: US 6,224,981 B1
(45) Date of Patent: May 1, 2001

(54) WATER-REDISPERSIBLE POWDERS OF FILM-FORMING POLYMERS HAVING A CORE/SHELL STRUCTURE

(75) Inventors: Joël Richard, Blou; William Bett, Paris, both of (FR)

(73) Assignee: Rhodia Chimi, Boulogne Billancourt Cedex (FR)

( * ) Notice: Subject to any disclaimer, the term of this patent is extended or adjusted under 35 U.S.C. 154(b) by 0 days.

(21) Appl. No.: 08/973,526

(22) PCT Filed: May 31, 1996

(86) PCT No.: PCT/FR96/00815

§ 371 Date: Dec. 5, 1997

§ 102(e) Date: Dec. 5, 1997

(87) PCT Pub. No.: WO96/41825

PCT Pub. Date: Dec. 27, 1996

(30) Foreign Application Priority Data

Jun. 9, 1995 (FR) .................................................. 95 06810

(51) Int. Cl.[7] .................. B32B 1/00; B32B 7/10; C08F 220/10; C08F 222/10
(52) U.S. Cl. .................... 428/407; 427/212; 427/213.34; 427/487; 525/54.2; 525/243; 525/262; 525/281; 525/285; 525/301; 525/310; 526/238.23
(58) Field of Search ..................... 428/403, 407; 427/212, 213.34, 487; 526/238.2, 238.23; 525/54.2, 242, 243, 310, 244, 262, 301, 281, 285

(56) References Cited

U.S. PATENT DOCUMENTS

| | | | | |
|---|---|---|---|---|
| 4,375,532 | * | 3/1983 | Baer | 525/310 |
| 4,876,313 | * | 10/1989 | Lorah | 525/281 |
| 5,506,324 | * | 4/1996 | Gartner et al. | 526/318.41 |
| 5,872,189 | * | 2/1999 | Bett et al. | 525/243 |

* cited by examiner

Primary Examiner—Paul Thibodeau
Assistant Examiner—Ramsey Zacharia
(74) Attorney, Agent, or Firm—Jean-Louis Seugnet

(57) ABSTRACT

The present invention relates to a water-redispersible powder based on film-forming polymers which are substantially water-insoluble and which are prepared by aqueous emulsion polymerization of monomers containing ethylenic unsaturation and with a "core/shell" structure comprising a hydrophobic core based on a polymer exhibiting a Tg (glass transition temperature) of between −30 and 25° C., preferably between −10 and 20° C., and a shell, the shell being bonded to the core by covalent bonds resulting from the reaction of an agent for grafting the shell onto the ethylenic unsaturations remaining in the core, characterized in that the shell is prepared by emulsion polymerization, on the core particles, of a mixture of monomers comprising at least one monomer chosen from styrene and a $C_1$–$C_{12}$ alkyl acrylate or methacrylate, at least one monomer carrying a saccharide group and exhibiting at least one ethylenic unsaturation, and at least one grafting agent.

32 Claims, No Drawings

WATER-REDISPERSIBLE POWDERS OF FILM-FORMING POLYMERS HAVING A CORE/SHELL STRUCTURE

This application is an application under 35 U.S.C. Section 371 of International Application Number PCT/FR96/00815, filed on May 31, 1996.

The present invention relates to water-redispersible powders based on film-forming polymers with a "core/shell" structure, the said film-forming polymers being prepared by aqueous emulsion polymerization of monomers containing ethylenic unsaturation.

Redispersible powders of the above type, which are generally obtained by spray-drying polymer latices, are already known. These powders have a great commercial advantage because they can be marketed as they are to the various users who redisperse them in water to prepare formulations which are suitable for the conventional uses of latices, namely especially the preparation of paper-coating compositions, paint compositions, adhesive coatings (pressure-sensitive adhesives, tiling adhesives) and additives to hydraulic binders of the mortar or concrete type.

It is understood that the sale of such powders which can be redispersed by the user into a pseudo- or neolatex has, when compared with the sale of the initial latex, the immense advantage of not comprising water, which generally constitutes at least 50% of the weight of the latex, and this entails considerable savings in transport and handling.

However, such powders must exhibit the following properties to be marketable:

they must be stable in storage, they must be easily redispersible in water at ambient temperature and must produce a neolatex of narrow particle size which is suitable for the targeted application, for the application as additive to hydraulic binders, more particularly targeted in the case of the present invention, the additive resulting from the redispersible powder must be compatible with the hydraulic binder, must allow the hydraulic binder to set solid without delaying the setting process and to impart to the coatings comprising the binder containing the additive a correct adhesiveness to the usual substrates, even in the moist state, as well as good mechanical properties, they must be redispersible in a wide pH range, they must exhibit a good redispersion in a medium containing multivalent, in particular alkaline, ions.

The objective of the present invention is to propose a redispersible powder exhibiting all of the desired properties indicated above, and a process for the preparation of this powder.

To this end, the invention relates first of all to a water-redispersible powder based on film-forming polymers which are substantially water-insoluble and which are prepared by aqueous emulsion polymerization of monomers containing ethylenic unsaturation and with a "core/shell" structure comprising:

a hydrophobic core based on a polymer exhibiting a Tg (glass transition temperature) of between −30 and 25° C., preferably between −10 and 20° C., and a shell, the shell being bonded to the core by covalent bonds resulting from the reaction of an agent for grafting the shell onto the ethylenic unsaturations remaining in the core, characterized in that the shell is prepared by emulsion polymerization, on the core, of a mixture of monomers comprising:

at most 90%, preferably from 50 to 80% by weight of at least one monomer chosen from styrene and a $C_1$–$C_{12}$ alkyl acrylate or methacrylate, at most 50%, preferably from 15 to 40% by weight of at least one monomer carrying a saccharide group and exhibiting at least one ethylenic unsaturation, and at most 10%, preferably at most 5% by weight of at least one grafting agent chosen from the (meth)allyl esters of (meth)acrylic acid, (meth)allyl esters of the mono- and diesters of maleic, fumaric and itaconic acids, and alkene derivatives of amides of acrylic and methacrylic acids, such as N-methallylmaleimide.

The invention also relates to a pseudolatex obtained by redispersion in water of a redispersible powder according to the invention.

The invention also relates to a process for the preparation of a powder according to the invention, which consists in carrying out the following stages:

the core is prepared by aqueous emulsion polymerization, then a mixture of monomers is polymerized in aqueous emulsion on the core in the presence of a grafting agent and of an organophilic polymerization initiator, whereby the shell is formed, then water is removed from the reaction mixture.

Finally, the invention relates to the use of the said pseudolatices and of the redispersible powders according to the invention as additives to hydraulic binders, adhesives, paper-coating compositions and paints.

The invention relates first of all to a water-redispersible powder based on film-forming polymers which are substantially water-insoluble and which are prepared by aqueous emulsion polymerization of monomers containing ethylenic unsaturation and with a "core/shell" structure comprising:

a hydrophobic core based on a polymer exhibiting a Tg (glass transition temperature) of between −30 and 25° C., preferably between −10 and 20° C., and a shell, the shell being bonded to the core by covalent bonds resulting from the reaction of an agent for grafting the shell onto the ethylenic unsaturations remaining in the core, characterized in that the shell is prepared by emulsion polymerization, on the core particles, of a mixture of monomers comprising:

at most 90%, preferably from 50 to 80% by weight of at least one monomer chosen from styrene and a $C_1$–$C_{12}$ alkyl acrylate or methacrylate, at most 50%, preferably from 15 to 40% by weight of at least one monomer carrying a saccharide group and exhibiting at least one ethylenic unsaturation, and at most 10%, preferably at most 5% by weight of at least one grafting agent chosen from the (meth)allyl esters of (meth)acrylic acid, (meth)allyl esters of the mono- and diesters of maleic, fumaric and itaconic acids, and alkene derivatives of amides of acrylic and methacrylic acids, such as N-methallylmaleimide.

The powder according to the invention is composed of particles based on water-insoluble film-forming polymers exhibiting a core/shell structure. These core/shell particles consist of a core formed by a hydrophobic and soft polymer, that is to say exhibit a Tg of between −30 and +25° C., preferably between −10 and +20° C., which comprises remaining ethylenic unsaturations, and of a shell based on a hard, hydrophilic polymer exhibiting a Tg higher than 55° C., preferably higher than 90° C. The shell is bonded to the core by covalent bonds resulting from the reaction of an agent for grafting the shell onto the ethylenic unsaturations remaining in the core.

The glass transition temperature is determined by the differential thermal analysis method.

Such particles of core/shell polymers which are substantially insoluble in water are prepared from a polymer latex by a two-stage polymerization process such as, for example, that described in patent U.S. Pat. No. 4,876,313, cited as reference, according to which, during a first stage, the core formed by a hydrophobic and soft polymer is prepared and, during a second stage, the shell formed by a hard and hydrophilic polymer is grafted onto the core.

In general the core is prepared by polymerization of a mixture of monomers comprising from 99.9 to 92% of at least one monomer chosen from styrene, butadiene and $C_1$–$C_{12}$ alkyl acrylates and methacrylates and from 0.1 to 8% of at least one monomer chosen from a carboxylic acid containing ethylenic unsaturation, an ester of unsaturated carboxylic acid containing a hydroxyalkyl functional group or a monomer containing an amide functional group. The core is preferably prepared by polymerization of a mixture of monomers based on styrene and butadiene.

The more or less hydrophobic nature of the core can be adjusted with the carboxylic acid monomers containing ethylenic unsaturation, such as acrylic acid, methacrylic acid, itaconic acid, maleic acid, fumaric acid, or a monomer ester of unsaturated carboxylic acid containing a hydroxalkyl functional group, like hydroxyethyl acrylate and hydroxypropyl acrylate or a monomer containing an amide functional group chosen, for example, from methylolacrylamide, acrylamide, methacrylamide and methylmethacrylamide.

A person skilled in the art knows how to choose the respective quantities of "hard" monomers (for example styrene and methyl methacrylate) and of "soft" monomers (for example butadiene and butyl acrylate) with a view to obtaining a polymer which has the desired Tg of between −30 and +25° C.

The monomers used during this first stage may be introduced as a mixture or separately and simultaneously into the reaction mixture, either before the beginning of the polymerization, once only, or during the polymerization, using successive fractions or continuously.

The polymerization of the monomers forming the core is carried out in the presence of an emulsifier and of a polymerization initiator.

The emulsifying agent employed is generally the conventional anionic agents represented especially by the alkali metal salts of fatty acids, alkyl sulphates, alkylsulphonates, alkylaryl sulphates, alkylarylsulphonates, aryl sulphates, arylsulphonates, sulphosuccinates and alkyl phosphates. They are employed in a proportion of 0.01 to 5% by weight relative to the total weight of the monomers.

The initiator for emulsion polymerization, which is water-soluble, is represented more particularly by hydroperoxides such as aqueous hydrogen peroxide, tert-butyl hydroperoxide, and by persulphates such as sodium persulphate, potassium persulphate and ammonium persulphate. It is employed in quantities between 0.05 and 2% by weight relative to the total of the monomers. These initiators are optionally used in combination with a reducing agent such as sodium bisulphite or formaldehyde sulphoxylate, polyethylene amines, sugars: dextrose, sucrose, or metal salts. The quantities of reducing agent which are employed vary from 0 to 3% relative to the total weight of the monomers.

The reaction temperature, which is a function of the initiator used, is generally between 0 and 100° C. and preferably between 50 and 80° C.

A transfer agent may be employed in proportions ranging from 0 to 3% by weight relative to the monomer(s), and is generally chosen from mercaptans such as n-dodecyl mercaptan, tert-dodecyl mercaptan, cyclohexene and halogenated hydrocarbons such as chloroform, bromoform and carbon tetrachloride.

At the end of the first stage of preparation of the core, the second stage of preparation of the shell is begun by adding directly to the latex comprising the core particles a mixture of monomers which is suitable for producing a hard and hydrophilic shell as defined above.

Furthermore, during the second stage an effective quantity of a grafting agent is added during the emulsion polymerization in order to bond the shell by covalent bonds to the ethylenic unsaturations remaining in the core, so as to graft the shell firmly onto the core.

Up to 90% by weight of the base monomers of the shell are chosen from styrene and a $C_1$–$C_{12}$ alkyl acrylate or methacrylate. The alkyl acrylate or methacrylate may be chosen, for example, from methyl or ethyl (meth)acrylate, butyl (meth)acrylate and 2-ethylhexyl (meth)acrylate.

The hydrophilic nature of the shell is adjusted by adding up to 50% by weight of a monomer carrying a saccharide group and exhibiting at least one ethylenic unsaturation. This monomer carrying a saccharide group and exhibiting at least one ethylenic unsaturation preferably carries a saccharide group chosen from mono- and disaccharides. In the case of monosaccharide groups, these may be, for example, glucose, galactose or fructose. In the case of disaccharide groups, these may be, for example, sucrose, lactose or maltose.

Very advantageously, the saccharide group is sucrose. In this latter case the monomer carrying a sucrose group and exhibiting at least one ethylenic unsaturation may be chosen from O-methacryloylsucrose, O-vinylbenzylsucrose or O-acetalstyrrylsucrose and their alkylated and/or acetylated derivatives in which the alkyl groups contain a number of carbons of between 1 and 4.

The important point is that the shell must have a substantially higher hydrophilic nature than the core. According to an embodiment of the invention the shell may be insoluble in an alkaline medium.

A person skilled in the art knows how to choose the respective quantities of "hard" monomers and of "soft" monomers with a view to obtaining a polymer which has the desired Tg of the shell higher than 55° C.

The polymerization mixture additionally contains a grafting agent in sufficient quantity and which is sufficiently reactive to produce covalent bonds between the shell and ethylenic bonds present in the core in order to graft the shell firmly onto the core.

This grafting agent consists of an organic compound containing at least two ethylenic unsaturations exhibiting different reactivities during emulsion polymerization reactions, the more reactive unsaturation reacting with the monomers with the result that the grafting agent forms an integral part of the polymer constituting the shell, the other unsaturation being insufficiently reactive to undergo polyaddition with the ethylenic unsaturations of the other monomers, but being sufficiently reactive to react with the remaining double bonds of the core to bind the shell to the core by covalent bonds.

An effective grafting agent which may be mentioned is the alkene and more particularly (meth)allyl esters of (meth)

acrylic acid, such as allyl methacrylate, allyl acrylate, (meth) allyl esters of the mono- and diesters of maleic, fumaric and itaconic acids, and alkene derivatives of amides of acrylic and methacrylic acids, such as N-methallylmaleimide.

The grafting agent may be added in a quantity which is generally at most 10%, preferably at least 0.2%, still more preferably of between 0.5 and 5% or even 0.5 and 3% by weight of the shell monomers.

According to a preferred embodiment of the invention the shell is prepared by emulsion polymerization of a mixture of methyl methacrylate, of O-methacryloylsucrose and of a grafting agent.

According to another preferred embodiment of the invention the shell is prepared by emulsion polymerization of a mixture of styrene, of O-vinylbenzylsucrose and of a grafting agent.

The emulsion polymerization of the shell is performed in conditions similar to those of the core.

In general, in the case of particles of redispersible powder according to the invention, the shell constitutes from 50 to 5%, preferably from 30 to 10%, by weight of the total core+shell weight.

The redispersible powder according to the invention may additionally include at least one inorganic filler. The latter may exhibit a variable particle size. It is recommended to employ as an inorganic filler a filler chosen especially from calcium carbonate, kaolin, barium sulphate, titanium oxide, talc, alumina hydrate, bentonite, silica and calcium sulphoaluminate (satin white).

The powder may include from 0.5 to 40, preferably from 2 to 20, parts by weight of the said filler per 100 parts by weight of film-forming polymers.

The particle size of the powder is generally smaller than 500 $\mu$m, preferably smaller than 100 $\mu$m.

The powders according to the invention generally exhibit a pH of between 4 and 9. They can be redispersed in any medium of pH of between 1 and 13, preferably between 4 and 10.

In most cases the powders according to the invention are completely redispersible in water at ambient temperature, merely by agitation. Completely redispersible is intended to mean a powder in accordance with the invention which, after the addition of a suitable quantity of water, makes it possible to obtain a pseudolatex whose particle size of the particles is substantially identical with the particle size of the latex particles present in the starting emulsion.

The powders according to the invention are stable in storage; they can be easily redispersed in water in the form of pseudolatex and employed directly in the form of powder or in the form of pseudolatex in all the known fields of application of latices.

The invention also relates to a pseudolatex obtained by redispersion in water of a redispersible powder as defined above.

The invention also relates to the process for the preparation of the redispersible powders according to the invention, which consists in implementing the following stages:
  the core is prepared by aqueous emulsion polymerization, then
  a mixture of monomers is polymerized in aqueous emulsion on the core in the presence of a grafting agent and of an organophilic polymerization initiator, whereby the shell is formed, then
  water is removed from the reaction mixture.

The stages described above are therefore implemented so as to form a latex of film-forming polymers with a core/shell structure and during the second stage of polymerization of the shell, as described above, the said polymerization is carried out in the presence of a grafting agent and of an organophilic polymerization initiator.

The organophilic polymerization initiator exhibits a high affinity for the particles of polymer constituting the core so as to improve the grafting. It is generally a peroxide or a perester such as especially cumene hydroperoxide, dicumyl peroxide, tert-butyl perneodecanote, tert-butyl per-3,5,5-trimethylhexanoate, bis(3,5,5-trimethylhexanoyl) peroxide, dioctanoyl peroxide, dilauroyl peroxide and dibenzoyl peroxide. It is more particularly recommended to employ the tert-butyl perbenzoate/ascorbic acid combination. The weight content of this combination may be between 0.5 and 5% by weight relative to the total weight of the monomers of the shell.

It should be noted that if a water-soluble initiator, such as ammonium persulphate, is employed instead of the organophilic initiator, a powder of mediocre redispersibility is obtained.

It is desirable to employ a transfer agent to adjust the molecular masses of the shell polymer. The same transfer agents may be employed as those mentioned above for preparing the core, as well as alkyl ($C_1$–$C_{12}$) mercaptan alkanoates ($C_1$–$C_6$), such as methylmercapto propionate.

The latex obtained generally exhibits a particle size of between 0.1 and 0.3 $\mu$m.

An inorganic filler as defined above may be optionally added to the latex with a view to making it easier to prepare the pulverulent composition. The respective contents of the various constituents are chosen such that the dried pulverulent compositions have the composition defined previously.

The water of this emulsion is next removed and the product obtained pulverized to obtain a powder. The stages of removal of the water from the latex emulsion and of obtaining a powder may be separate or combined. It is thus possible to employ a process of freezing, followed by a stage of sublimation or of freeze-drying, of drying or of drying by atomizing (spray-drying).

The water is preferably removed after the pH of the reaction mixture has been adjusted between 6 and 9.

Drying by atomizing is the preferred process because it makes it possible to obtain directly the powder with the desired particle size without necessarily going through the grinding stage. The drying by atomizing can be performed in the usual manner in any known apparatus such as, for example, an atomizing tower combining a pulverization produced by a nozzle or a turbine with a stream of hot gas.

The entry temperature of the hot gas (generally air) at the head of the column is preferably between 100 and 115° C. and the exit temperature is preferably between 55 and 65° C.

Inorganic fillers may be added to the aqueous emulsion of starting polymer or else directly into the final pulverulent composition.

All or part of the inorganic filler is preferably introduced during the pulverization stage in the process of drying by atomizing (spray-drying).

The presence of these inorganic fillers in the emulsion promotes the preparation of the powder and its stability in storage, avoiding aggregation of the powder, that is to say its caking.

The redispersible powders or the pseudolatices according to the invention are very particularly suitable in the building industry as additives to the mixtures of hydraulic mineral binders for the production of protective and decorative coatings and of adhesive mortars and adhesive cements intended for the laying of tiling and of floor coverings, where they are employed in a weight proportion of 1 to 10%, preferably of 2 to 5%. They are found to be particularly well suited to the preparation of ready-for-use powdered products based on cement and on plaster. They do not increase the setting time of these binders and do not exhibit or induce any caking in storage.

The powders of the invention or the pseudolatices derived therefrom are furthermore usable in all the other fields of application of latices, more particularly in the field of adhesives, of paper coating and of paints. The powders according to the invention may additionally comprise the usual additives, in particular biocides, microbiostats, bacteriostats and silicone and organic foamsuppressors.

The powders of the invention can also be employed as reactive powders with polymers carrying isocyanate, epoxy or acidic bonds for crosslinking the products for paint and coating.

In all that follows or that precedes, the parts and percentages are expressed by weight, unless shown otherwise. Examples will now be given, no limitation being implied.

EXAMPLES

Example 1

Overpolymerization of 4% by Weight of O-Methacryloylsucrose on a Seed of Styrene-Carboxylated Butadiene Copolymer in the Presence of Grafting Agent.

1. 4 kg of a seed latex with a mass solids content of 49.5% are prepared by emulsion polymerization in the presence of ammonium persulphate of a mixture of:

37% by weight of butadiene,

59% by weight of styrene, and

4% by weight of acrylic acid. tert-Butyl mercaptan is employed as transfer agent in a proportion of 0.8% by weight relative to the monomer mixture.

2. The following three solutions are prepared:

Solution A: mixture of 217.5 g of methyl methacrylate (MMA) and 1.9 g of allyl methacrylate (ALMA), which is a grafting agent.

Solution B: mixture of 79 g of O-methacryloylsucrose in 150 g of deionized water.

Solution C: mixture of 2.9 g of ascorbic acid and of 2 g of sodium dodecylbenzenesulphonate, which is an emulsifier.

3. The seed latex prepared in stage 1 is charged into a polymerization reactor equipped with a stirrer, a condenser and reactant feed tubes. It is heated for 1 h with stirring so as to reach a temperature of 80±1° C.

During this temperature rise 7.4 g of tertbutyl perbenzoate (which forms the polymerization initiator with the ascorbic acid) are mixed with 26.3 g of solution A and this mixture is introduced into the reactor during its rise in temperature, at the time when the latter reaches 30±1° C. Then, when the temperature reaches 35±1° C., 27.3 g of solution B are added to the reactor.

Finally, when the temperature of the reactants reaches 80±1° C. and has stabilized, the remainder of solutions A and B is added to the reactor over a period of 3 h, and solution C over a period of 3 h 30 min.

At the end of the introduction of the reactants of solutions A, B and C the reactor mixture is maintained at 80±1° C. for 1 h.

The latex is then cooled and discharged from the reactor. It is found that no grain and no crust has formed on the wall of the reactor during the polymerization.

4. The latex obtained exhibits the following characteristics:

solids content: 51.1% by weight, pH=5.0, viscosity measured in Brookfield RTV-DV 11 at 50 rev/min: 180 mPa s, particle size measured by Brookhaven DCP 1000 photosedimentometer: 0.17±0.01 μm.

Example 2

Overpolymerization of 6% by Weight of O-Methacryloylsucrose on a Seed of Styrene-Carboxylated Butadiene Copolymer in the Presence of Grafting Agent.

The operations carried out in Example 1 are repeated, except that solution B includes a mass of 118.8 g of O-methacryloylsucrose.

The latex obtained exhibits the following characteristics:

solids content: 51% by weight, pH=5.0, viscosity measured in Brookfield RTV-DV 11 at 50 rev/min: 320 mPa s, particle size measured by Brookhaven DCP 1000 photosedimentometer: 0.17±0.01 μm.

Example 3

Drying of the Latices Obtained in the Preceding Examples and Redispersion of the Powders Obtained.

The latices prepared from Examples 1 and 2 are converted into powder by spray-drying after adjustment of their pH to 7 with a 10% sodium hydroxide solution. This drying is carried out in a spraying tower in which the hot air entry temperature is 105° C. and the exit temperature 60° C. During the spraying operation an anticaking agent (kaolin) is added to the latex in a proportion of 12% by weight.

The powders obtained exhibit the following characteristics:

excellent fluidity, great stability in storage: no caking appears after storage for 2 weeks at 55° C., excellent wetting by water, spontaneous, rapid and complete redispersion both in deionized water and in a concentrated (1M) $CaCl_2$ solution.

The particle size distributions of the pseudolatices obtained by redispersion of these powders in water, determined with a Brookhaven DCP 1000 photosedimentometer, are identical with those of the latices of Examples 1 and 2.

The powders exhibit good properties when they are employed in a proportion of 5% by weight in standard mortars. In particular, they improve their setting time and their mechanical properties.

Comparative Example 4

Overpolymerization of 4% by Weight of O-Methacryloylsucrose on a Styrene/Carboxylated Butadiene Seed Without Grafting Agent.

The procedure of Example 1 is implemented, leaving out the grafting agent, that is to say allyl methacrylate from solution A. The latex obtained exhibits the following characteristics:

solids content: 51.1% by weight, pH=5.0, viscosity measured in Brookfield RTV-DV 11 at 50 rev/min: 520 mPa s, particle size measured by Brookhaven DCP 1000 photosedimentometer: 0.16±0.01 μm.

After atomization by spray-drying according to the procedure of Example 3, the powder obtained exhibits only a partial redispersibility: the percentage of particles of size greater than 43 μm is 40%.

What is claimed is:

1. A water-redispersible powder comprising film-forming polymers which are water-insoluble and with a "core/shell" structure, the core and the shell being prepared by aqueous emulsion polymerization of monomers containing ethylenic unsaturation, the powder comprising:
   a hydrophobic core consisting of a polymer exhibiting a glass transition temperature of between −30 and 25° C., and
   a shell, the shell being bonded to the core by covalent bonds resulting from the reaction of an agent for grafting the shell onto the ethylenic unsaturations remaining in the core, wherein the shell is prepared by emulsion polymerization, on the core, of a mixture of monomers comprising:
   from 50 to 90% by weight of at least one monomer chosen from styrene and a $C_1$–$C_{12}$ alkyl acrylate or methacrylate,
   from 15 to 50% by weight of at least one monomer carrying a saccharide group and exhibiting at least one ethylenic unsaturation, and
   from 0.2 to 10% by weight of at least one grafting agent which is an alkene ester or an alkene amide of acrylic or methacrylic acid.

2. A powder according to claim 1, wherein the shell is prepared by emulsion polymerization of a mixture of styrene, O-vinylbenzylsucrose, and a grafting agent.

3. A powder according to claim 1, wherein the shell constitutes from 50 to 5% by weight of the total core and shell weight.

4. A powder according to claim 1, wherein said powder comprises at least one inorganic filler.

5. A process for the preparation of a powder according to claim 1, comprising the steps of:
   (1) preparing the core by aqueous emulsion polymerization, then
   (2) polymerizing the mixture of monomers for the preparation of the shell in aqueous emulsion on the core in the presence of a grafting agent and of an organophilic polymerization initiator, whereby the shell is formed, and then
   (3) removing water from the reaction mixture.

6. A process according to claim 5, wherein the organophilic polymerization initiator is a peroxide or a perester.

7. A process according to claims 5, wherein in step (3) the water is removed by spray-drying.

8. A powder according to claim 1, wherein the grafting agent is an allyl- or methallylester of acrylic or methacrylic acid, an allyl- or methallylester of a mono- or diester of maleic, fumaric or itaconic acid, or an alkene amide of acrylic or methacrylic acid.

9. A powder according to claim 1, wherein the core is prepared by polymerization of a mixture of monomers comprising from 99.9 to 92% of at least one monomer selected from the group consisting of styrene, butadiene, and $C_1$–$C_{12}$ alkyl acrylates and methacrylates and from 0.1 to 8% of at least one monomer selected from the group consisting of a carboxylic acid containing ethylenic unsaturation, an ester of unsaturated carboxylic acid containing a hydroxyalkyl functional group, and a monomer containing an amide functional group.

10. A powder according to claim 9, wherein the core is prepared by polymerization of a mixture of monomers comprising styrene and butadiene.

11. A powder according to claim 1, wherein the monomer carrying a saccharide group and exhibiting at least one ethylenic unsaturation carries a saccharide group which can be a mono- or a disaccharide.

12. A powder according to claim 11, wherein the saccharide group is sucrose.

13. A powder according to claim 11, wherein the monomer carrying a saccharide group and exhibiting at least one ethylenic unsaturation is O-methacryloylsucrose, O-vinylbenzylsucrose, or O-acetalstyrylsucrose.

14. A powder according to claim 1, wherein the shell is prepared by emulsion polymerization of a mixture of methyl methacrylate, O-methacryloylsucrose, and a grafting agent.

15. A powder according to claim 1, wherein the shell is prepared by emulsion polymerization of a mixture of styrene, O-vinylbenzylsucrose, and a grafting agent.

16. A powder according to claim 1, wherein the shell constitutes from 50 to 5% by weight of the total core and shell weight.

17. A powder according to claim 1, wherein said powder comprises at least one inorganic filler.

18. A pseudolatex obtained by redispersion in water of a powder as defined in claim 1.

19. A method of using a pseudolatex as defined in claim 18 as additive to hydraulic binders, comprising the step of adding to said hydraulic binders a proportion of 1 to 10% by weight of said pseudolatex.

20. A method of using a powder as defined in claim 1, as additive to hydraulic binders comprising the step of adding to said hydraulic binders a proportion of 1 to 10% by weight of said powder.

21. A water-redispersible powder comprising film-forming polymers which are water-insoluble and which are prepared by aqueous emulsion polymerization of monomers containing ethylenic unsaturation and with a "core/shell" structure, wherein the hydrophobic core consists of a polymer exhibiting a Tg of between −10 and 20° C. and the shell is prepared by emulsion polymerization, on the core, of a mixture of monomers comprising:
   from 50 to 80% by weight of at least one monomer chosen from styrene and a $C_1$–$C_{12}$ alkyl acrylate or methacrylate,
   from 15 to 40% by weight of at least one monomer carrying a saccharide group and exhibiting at least one ethylenic unsaturation, and
   at most 5% by weight of at least one grafting agent which is an alkene ester or an alkene amide of acrylic or methacrylic acid.

22. A powder according to claim 21, wherein the grafting agent is an allyl- or methallylester of acrylic or methacrylic acid, an allyl- or methallylester of a mono- or diester of maleic, fumaric or itaconic acid, or N-methallylmaleimide.

23. A powder according to claim 21, wherein the core is prepared by polymerization of a mixture of monomers comprising from 99.9 to 92% of at least one monomer selected from the group consisting of styrene, butadiene, and $C_1$–$C_{12}$ alkyl acrylates and methacrylates and from 0.1 to 8% of at least one monomer selected from the group consisting of a carboxylic acid containing ethylenic unsaturation, an ester of unsaturated carboxylic acid containing a hydroxyalkyl functional group, and a monomer containing an amide functional group.

24. A powder according to claim 23, wherein the core is prepared by polymerization of a mixture of monomers based on styrene and butadiene.

25. A powder according to claim 21, wherein the monomer carrying a saccharide group and exhibiting at least one ethylenic unsaturation carries a saccharide group which can be a mono- or a disaccharide.

26. A powder according to claim 25, wherein the saccharide group is sucrose.

27. A powder according to claim 25, wherein the monomer carrying a saccharide group and exhibiting at least one ethylenic unsaturation is O-methacryloylsucrose, O-vinylbenzylsucrose, or O-acetalstyrylsucrose.

28. A powder according to claim 21, wherein the shell is prepared by emulsion polymerization of a mixture of methyl methacrylate, O-methacryloylsucrose. and a grafting agent.

29. A pseudolatex obtained by redispersion in water of a powder as defined in claim 20.

30. A method of using a pseudolatex as defined in claim 29 as additive to hydraulic binders, comprising the step of adding to said hydraulic binders a proportion of 1 to 10% by weight of said pseudolatex.

31. A method of using a powder as defined in claim 21, as additive to hydraulic binders comprising the step of adding to said hydraulic binders a proportion of 1 to 10% by weight of said powder.

32. A water-redispersible powder according to claim 21, comprising from 0.2 to 10% by weight of at least one grafting agent which is an alkene ester or an alkene amide of acrylic or methacrylic acid.

* * * * *